United States Patent
Choi et al.

(10) Patent No.: US 8,227,972 B2
(45) Date of Patent: Jul. 24, 2012

(54) DISPLAY FILTER AND PLASMA DISPLAY PANEL INCLUDING THE SAME

(75) Inventors: Yeon-Joo Choi, Suwon-si (KR); Cha-Won Hwang, Suwon-si (KR); Sang-Mi Lee, Suwon-si (KR); Seung-Goo Baek, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 41 days.

(21) Appl. No.: 12/828,914

(22) Filed: Jul. 1, 2010

(65) Prior Publication Data

US 2011/0031872 A1 Feb. 10, 2011

(30) Foreign Application Priority Data

Aug. 7, 2009 (KR) .................. 10-2009-0072736

(51) Int. Cl.
H01J 61/42 (2006.01)
H01J 5/16 (2006.01)
G02B 5/22 (2006.01)
G02B 1/11 (2006.01)

(52) U.S. Cl. .......... 313/485; 313/586; 313/587; 445/24; 445/25

(58) Field of Classification Search .......... 313/581–587, 313/44–47, 485; 361/681, 682, 688–747; 349/58–60; 348/747, 749, 789, 836–841
See application file for complete search history.

(56) References Cited

U.S. PATENT DOCUMENTS

| | | | | |
|---|---|---|---|---|
| 6,333,592 | B1 * | 12/2001 | Sasa et al. | 313/112 |
| 2002/0093606 | A1 * | 7/2002 | Higuchi | 349/104 |
| 2008/0191624 | A1 * | 8/2008 | Hong et al. | 313/582 |

FOREIGN PATENT DOCUMENTS

| | | |
|---|---|---|
| KR | 1020070021563 | 2/2007 |
| KR | 1020070076969 | 7/2007 |
| KR | 1020070082686 | 8/2007 |

* cited by examiner

*Primary Examiner* — Tracie Y Green
(74) *Attorney, Agent, or Firm* — Robert E. Bushnell, Esq.

(57) ABSTRACT

A display filter includes a base film disposed on a display panel. The base film includes a phototransmissive unit having a constant horizontal cross-sectional area, and a light absorbing unit which includes a light absorbing material and surrounds the phototransmissive unit. A plasma display panel (PDP) may include the display filter. The display filter may improve ambient contrast by increasing the transmittance of light emitted by a display panel and by blocking externally incident light.

19 Claims, 4 Drawing Sheets

DISPLAY FILTER AND PLASMA DISPLAY PANEL INCLUDING THE SAME

CLAIM OF PRIORITY

This application makes reference to, incorporates into this specification the entire contents of, and claims all benefits accruing under 35 U.S.C. §119 from an application earlier filed in the Korean Intellectual Property Office filed on Aug. 7, 2009, and there duly assigned Serial No. 10-2009-0072736.

BACKGROUND OF THE INVENTION

1. Field of the Invention

One or more embodiments of the present invention relate to a display filter and a plasma display panel (PDP) including the same, and more particularly, to a display filter, which may improve ambient contrast by increasing the transmittance of light emitted by a display panel and by blocking externally incident light, and a PDP including the same.

2. Description of the Related Art

Plasma display panels (PDP) may reproduce natural colors and may be driven quickly, and thus PDPs are used as large display apparatuses. A PDP may be formed by sealing discharge gas between two substrates on each of which a plurality of electrodes are arranged.

A general alternating current (AC) PDP includes a top panel, which displays images to a user, and a bottom panel, which is combined with the top panel in parallel. Sustain electrode pairs are disposed on a front substrate of the top panel. Address electrodes are disposed on a rear substrate of the bottom panel, which faces the front substrate on which the sustain electrode pairs are disposed, to cross the sustain electrode pairs on the front substrate.

A first dielectric material layer and a second dielectric material layer are formed on the front substrate on which the sustain electrode pairs are formed and the rear substrate on which the address electrodes are formed, respectively, to cover the sustain electrode pairs and the address electrodes, respectively. A barrier rib is formed on the top surface of the second dielectric material layer to maintain a discharge distance and to prevent electrical and optical crosstalk between discharge cells.

Red, green, and blue phosphors are applied on sidewalls of the barrier rib and on portions of the top surface of the second dielectric material layer on which the barrier rib is not formed.

In the PDP, a voltage is applied between the sustain electrode pairs, and ultraviolet (UV) rays are emitted by discharges occurring due to the application of the voltage. At this point, the UV rays excite the phosphors that are formed in patterns and the excited phosphors emit visible rays that pass through the front substrate and are discharged to outside, and thus images may be displayed.

Generally, a phosphor has a light color. Thus, external light incident via a front substrate may be reflected by a phosphor even if the phosphor is in a dark screen. Thus, a phosphor may illuminate brightly even for pixels displaying dark colors.

Thus, ambient contrast of a PDP may be further reduced due to the reflection of external light, compared to other display apparatuses.

SUMMARY OF THE INVENTION

It is therefore an aspect of the present invention to provide an improved plasma display panel (PDP).

It is another aspect of the present invention to provide a display filter which may improve ambient contrast by increasing the transmittance of light emitted by a display panel and by blocking externally incident light.

It is still another aspect of the present invention to provide a plasma display panel (PDP) including the display filter.

Additional aspects will be set forth in part in the description which follows and, in part, will be apparent from the description, or may be learned by practice of the presented embodiments.

According to one or more embodiments of the present invention, a display filter may include a base film disposed on a display panel. The base film includes a phototransmissive unit having a constant horizontal cross-sectional area, and a light absorbing unit which includes a light absorbing material and surrounds the phototransmissive unit.

The horizontal cross-section of the phototransmissive unit may be circular, elliptical, rectangular, or polygonal.

A plurality of the phototransmissive units may be arranged next to each other in first rows and second rows that alternate with each other. The phototransmissive units in each one of the first rows may be disposed to alternate with the phototransmissive units in the immediately adjacent ones of the second rows.

The light absorbing unit may include colored pigments which absorb visible rays.

The pigments may be colored in black.

The base film may be directly attached to a light extracting surface of the display panel.

The display filter may further include an anti-reflection film disposed on the base film, and an anti-glare film disposed on the anti-reflection film.

According to one or more embodiments of the present invention, a plasma display panel (PDP) may be constructed by including a first substrate and a second substrate that are disposed apart from each other, sustain electrodes extending between the first substrate and the second substrate in a direction, address electrodes extending between the first substrate and the second substrate in another direction which is different from the direction in which the sustain electrodes extend, barrier ribs defining a plurality of discharge cells between the first substrate and the second substrate, and a base film disposed on the first substrate. The base film includes a phototransmissive unit having a constant horizontal cross-sectional area, and a light absorbing unit which includes a light absorbing material and surrounds the phototransmissive unit.

The PDP may further include a first dielectric material layer disposed on the first substrate to cover the sustain electrodes, and a second dielectric material layer dispose on the second substrate to cover the address electrodes.

The PDP may further include phosphor layers formed within the discharge cells, and a passivation layer which is formed to cover a surface of the first dielectric material layer facing the second substrate to protect the first dielectric material layer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
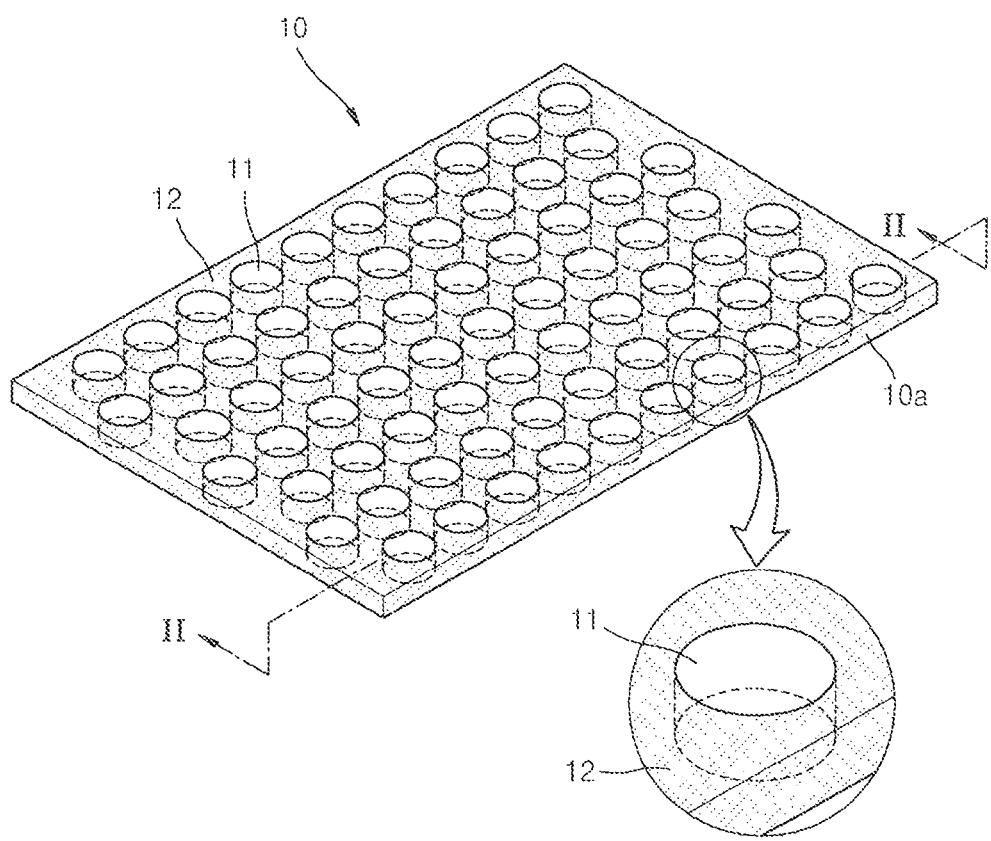
FIG. 1 is an oblique view of a display filter constructed as an embodiment according to the principles of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

Figure 2:
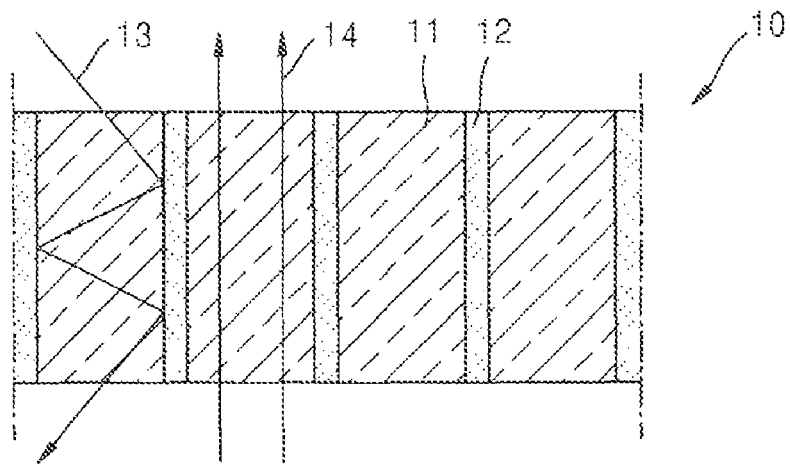
FIG. 2 is a sectional view of the display filter of FIG. 1, taken along a line II-II of FIG. 1.
Figure 3:
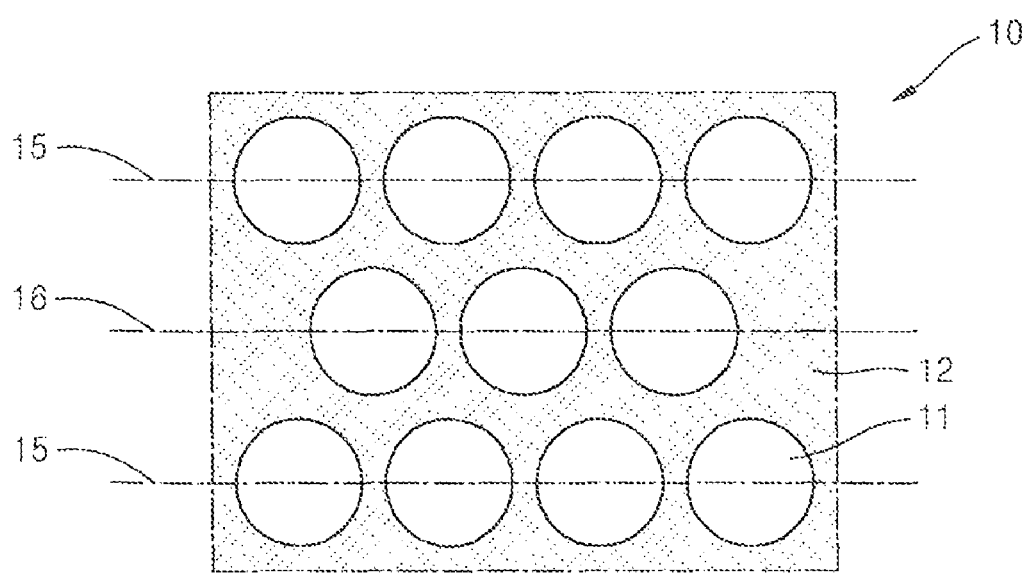
FIG. 3 is a plan view of the display filter of FIG. 1.

FIG. 1 is an oblique view of a display filter 10 constructed an embodiment according to the principles of the present invention. FIG. 2 is a sectional view taken along a line II-II of FIG. 1. FIG. 3 is a plan view of the display filter 10 of FIG. 1.

Referring to FIGS. 1 through 3, display filter 10 according to the present embodiment may include a base film 10a, which may be disposed on a display panel to improve ambient contrast. Base film 10a includes a phototransmissive unit 11 formed of light transmissive material and a light absorbing unit 12 formed of light absorbing material.

Meanwhile, display filter 10 may also include various other filters, such as a filter to block electromagnetic interference (EMI), other than a filter to improve ambient contrast according to embodiments of the present invention.

Phototransmissive unit 11 has a cylindrical shape having a constant horizontal cross-sectional area. In this specification and claims, a horizontal cross-section is perpendicular to an longitudinal axis of a cylinder. In other words, phototransmissive unit 11 maintains a constant cross-sectional shape from an end of base film 10a to an opposite end of base film 10a, and thus phototransmissive unit 11 has a constant cross-sectional area. That is, in the embodiment shown in FIGS. 1-3, phototransmissive unit 11 is a cylindrical tube formed from an upper surface of base film 10a to an opposite and lower surface of base film 10. Phototransmissive unit 11 maintains the constant cross-sectional shape from the upper surface of base film 10a to the lower surface of base film 10a. In base film 10a, light absorbing unit 12 includes a light absorbing material and is disposed to surround phototransmissive unit 11.

Display filter 10 may be formed as a film, which includes base film 10a, and may be attached to a display panel. Portions of base film 10a, excluding light absorbing unit 12, may be phototransmissive unit 11, and portions of base film 10a, excluding phototransmissive unit 11, may be light absorbing unit 12 that includes a light absorbing material.

Display filter 10 may be a film directly attachable to a front surface of a display panel, such as a plasma display panel (PDP), via which light is emitted. Display filter 10 may be formed as a film in which phototransmissive unit 11, which is cylindrical, is horizontally arranged. Phototransmissive unit 11 may be designed such that its upper diameter and its lower diameter are the same.

Accordingly, ambient contrast may be improved by increasing the transmittance of panel light 14 emitted from inside a display panel and absorbing and blocking external light 13 incident from outside with light absorbing unit 12.

As shown in FIG. 1, the cross-section of phototransmissive unit 11 may be circular or elliptical. In other words, a plurality of phototransmissive units 11 having a cylindrical shape may be arranged horizontally. Also, light absorbing unit 12 is formed to surround the sidewalls of phototransmissive units 11. Thus, external light 13 incident from outside is absorbed by light absorbing unit 12, and refraction of external light 13 and transmittance of panel light 14 occur at phototransmissive units 11 having the cylindrical shape.

External light 13 is incident into a cylindrical space of phototransmissive units 11 surrounded by light absorbing unit 12. As shown in FIG. 2, external light 13 is partially absorbed by light absorbing unit 12 adjacent to phototransmissive units 11, and is partially refracted and travels within phototransmissive units 11 in a downward direction of FIG. 2. While external light 13 travels within phototransmissive units 11, the light intensity of external light 13 gradually decreases as external light 13 is partially absorbed and refracted by light absorbing unit 12, and thus the intensity of external light 13 reaching the surface of the display panel significantly decreases.

In the embodiment shown in FIG. 2, phototransmissive units 11 and light absorbing unit 12 are arranged horizontally, wherein the width of light absorbing unit 12 may be 5 μm, and the diameter of each of the cylindrical phototransmissive units 11 may be 95 μm.

External light 13 incident to display filter 10 is partially absorbed directly by light absorbing unit 12, and partially travels within phototransmissive units 11 and is reflected and absorbed by light absorbing unit 12. Since most of the intensity of external light 13 is lost while external light 13 is either reflected or refracted between phototransmissive units 11 and light absorbing unit 12, external light reflection, which refers to external light 13 reflected by the display panel, significantly decreases.

As shown in FIG. 2, panel light 14 emitted from inside of the display panel, however, is not refracted and may either travel in a straight line perpendicular to the display panel or travel along at least a relatively straighter path than external light 13, which includes reflections of light at various incident angles. Thus, using display filter 10 according to embodiments of the present invention, the decrease of panel light transmittance is significantly less than the decrease of external light reflection.

The increased transmittance of panel light 14 helps to improve brightness. Accordingly, ambient contrast is improved as external light reflection decreases and brightness increases.

Unlike external light 13, panel light 14 is barely lost due to refraction. Thus, ambient contrast may be improved as external light reflection decreases and the transmittance of the display panel increases.

The cylindrical structures of phototransmissive units 11 may be arranged as shown in FIG. 3. Phototransmissive units 11 having circular or elliptical cross-sections are arranged as shown in FIG. 3. Phototransmissive units 11 may be arranged next to each other in alternating rows to form first rows 15 and second rows 16 that alternate with each other. As shown in FIG. 3, phototransmissive units 11 of first row 15 may be arranged alternately with phototransmissive units 11 of second row 16. That is, in the embodiment shown in FIG. 3, phototransmissive units 11 of first row 15 are not overlying in alignment with phototransmissive units 11 of second row 16.

Thus, in the case where phototransmissive units 11 having circular or elliptical cross-sections are used, an area ratio of phototransmissive units 11 with respect to the entire base film 10a increases, and thus the transmittance of the display panel may further be improved.

The size of the cross-section area of phototransmissive unit 11 may be determined according to the size of a pixel. For example, the cross-sectional area of each of phototransmissive units 11 may have the same size and the same shape as the cross-sectional area of a pixel, such that phototransmissive units 11 respectively correspond to the pixels.

Here, display filter 10 may be arranged on a surface of a PDP such that each of phototransmissive units 11 is located in a position corresponding to each pixel. However, embodiments of the present invention are not limited thereto; and display filter 10 may be arranged such that a plurality of phototransmissive units 11 correspond to each pixel. In this case, no additional arrangement is necessary when display filter 10 is attached on a surface of a PDP, and thus the attachment of display filter 10 to the surface of the PDP may be easier.

Base film 10a may be formed of polyethersulphone (PED), polyacrylate (PAR), polyetherimide (PEI), polyethyelenen napthalate (PEN), polyethyeleneterepthalate (PET), polyphenylene sulphide (PPS), polyallylate, polyimide, polycarbonate (PC), TAC, or cellulose acetate propinonate (CAP). In one embodiment according to the principles of the present invention, base film 10a may be formed of PC, PET, TAC, or PEN. In another embodiment according to the principles of the present invention, phototransmissive unit 11 may be formed of light transmissive material such as polyethersulphone (PED), polyacrylate (PAR), polyetherimide (PEI), polyethyelenen napthalate (PEN), polyethyeleneterepthalate (PET), polyphenylene sulphide (PPS), polyallylate, polyimide, polycarbonate (PC), TAC, or cellulose acetate propinonate (CAP).

Base film 10a may be colored to have a predetermined color. Thus, the visible ray transmittance of the entire display filter 10 may be controlled by adjusting the conditions of coloring base film 10a. For example, if base film 10a is colored to have a dark color, the visible ray transmittance of display filter 10 decreases.

Furthermore, colors of visible rays emitted forward may be controlled by adjusting the conditions of coloring base film 10a. In other words, either base film 10a may be entirely colored to have a color which is visually pleasant to users or base film 10a may be colored to improve the color purity of a display apparatus to which display filter 10 according to an embodiment of the present invention is employed. Furthermore, base film 10a may have colored patterns to correspond to each sub-pixel of a PDP to which display filter 10 according to an embodiment of the present invention is employed. However, embodiments of the present invention are not limited thereto, and base film 10a may be colored in various ways for various color corrections of base film 10a.

Light absorbing unit 12 contains a light absorbing material. Light absorbing unit 12 may have greater light absorbing rate than phototransmissive unit 11.

Here, the light absorbing material contained in light absorbing unit 12 may be colored pigments with excellent visible ray absorbing rate. The color of pigments in light absorbing unit 12 may be black to absorb external light well.

Figure 4:
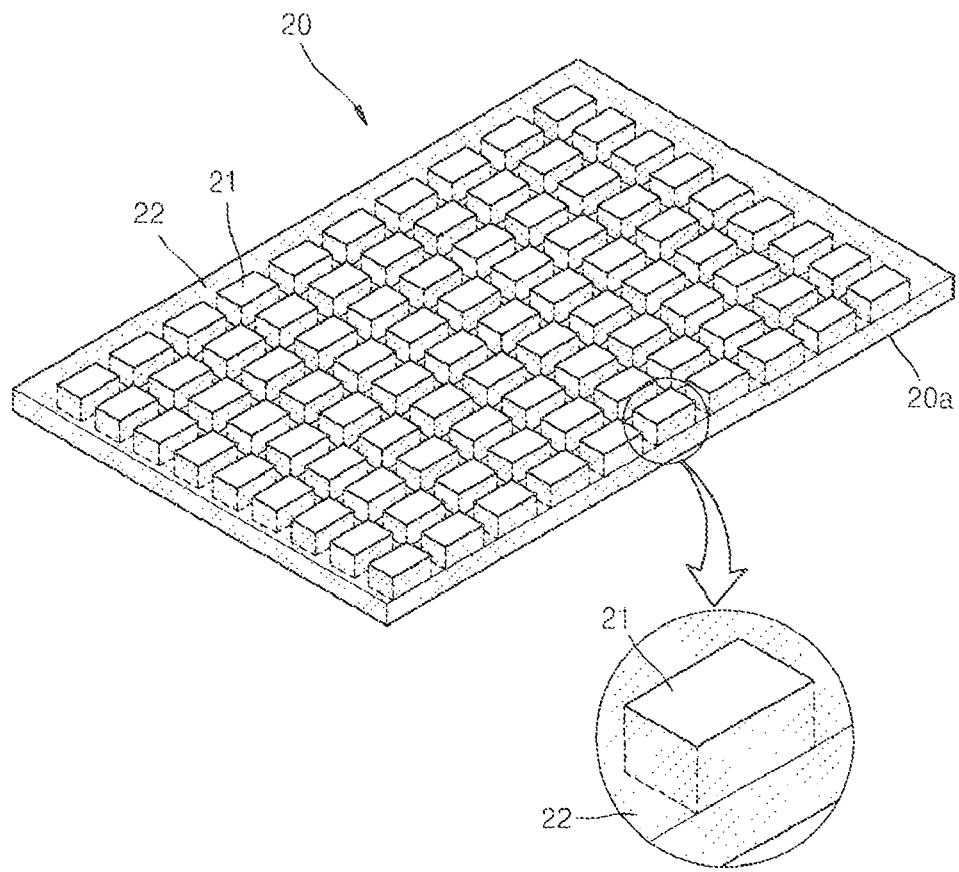
FIG. 4 is an oblique view of a display filter constructed as another embodiment according to the principles of the present invention.

FIG. 4 is an oblique view of a display filter 20 constructed as another embodiment according to the principles of the present invention.

Referring to FIG. 4, as compared to display filter 10 shown in FIG. 1, the cross-section of a phototransmissive unit 21 is rectangular or polygonal in display filter 20 according to the present embodiment. Display filter 20 according to the present embodiment is otherwise identical to the display filter 10 of FIG. 1, and thus detailed descriptions of identical elements will be omitted.

Display filter 20 according to the present embodiment may include a base film 20a, which may be arranged on a display panel, to improve ambient contrast. Here, base film 20a includes phototransmissive unit 21 and a light absorbing unit 22.

Phototransmissive unit 21 has a constant cross-sectional area. Light absorbing unit 22 includes a light absorbing material and is disposed to surround phototransmissive unit 21.

The cross-section of phototransmissive unit 21 may be rectangular or polygonal. In other words, a plurality of phototransmissive units 21 having a rectangular pipe-like shape may be arranged horizontally. Light absorbing unit 22 may be formed to surround sidewalls of phototransmissive units 21. Thus, an external light incident from outside is absorbed by light absorbing unit 22, and refraction of the external light and transmittance of a panel light occur at phototransmissive units 21.

The rectangular structures of phototransmissive units 21 may be arranged in rows, as shown in FIG. 4.

According to embodiments of the present invention, ambient contrast may be improved by increasing the transmittance of panel light emitted from inside a display panel and absorbing and blocking external light incident from outside with light absorbing unit 22.

Figure 5:
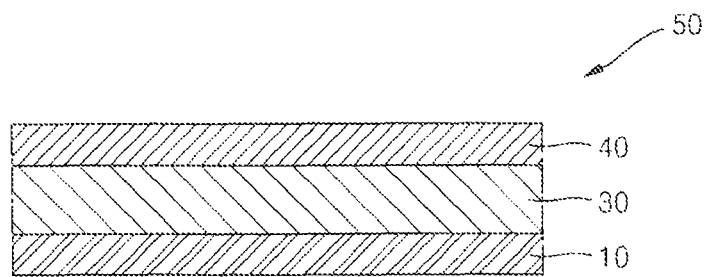
FIG. 5 is a sectional view of a display filter constructed as still another embodiment according to the principles of the present invention.

FIG. 5 is a sectional view of a display filter 50 constructed as still another embodiment according to the principles of the present invention.

Referring to FIG. 5, display filter 50 may include display filter 10 of FIG. 1 for improving ambient contrast, an anti-reflection film 30, and an anti-glare film 40.

Anti-reflection film 30 may be disposed on a surface of base film 10a of display filter 10 and prevent reflection of externally incident light. Anti-glare film 40 may be disposed on a surface of anti-reflection film 30 and prevent glare due to reflection of externally incident light. Anti-reflection film 30 and Anti-glare film 40 may be a general anti-reflection film and a general anti-glare film, respectively.

In the present embodiment, anti-reflection film 30 and anti-glare film 40 are sequentially disposed on display filter 10 of FIG. 1. However, embodiments of the present invention are not limited thereto, and the sequence of disposing the display filter 10 of FIG. 1, anti-glare film 40, and anti-reflection film 30 may vary.

Furthermore, various films or adhesive layers may also be disposed on display filter 50.

Display filter 50 according to the present embodiment may not only improve ambient contrast, but also prevent reflection and glare.

Figure 6:
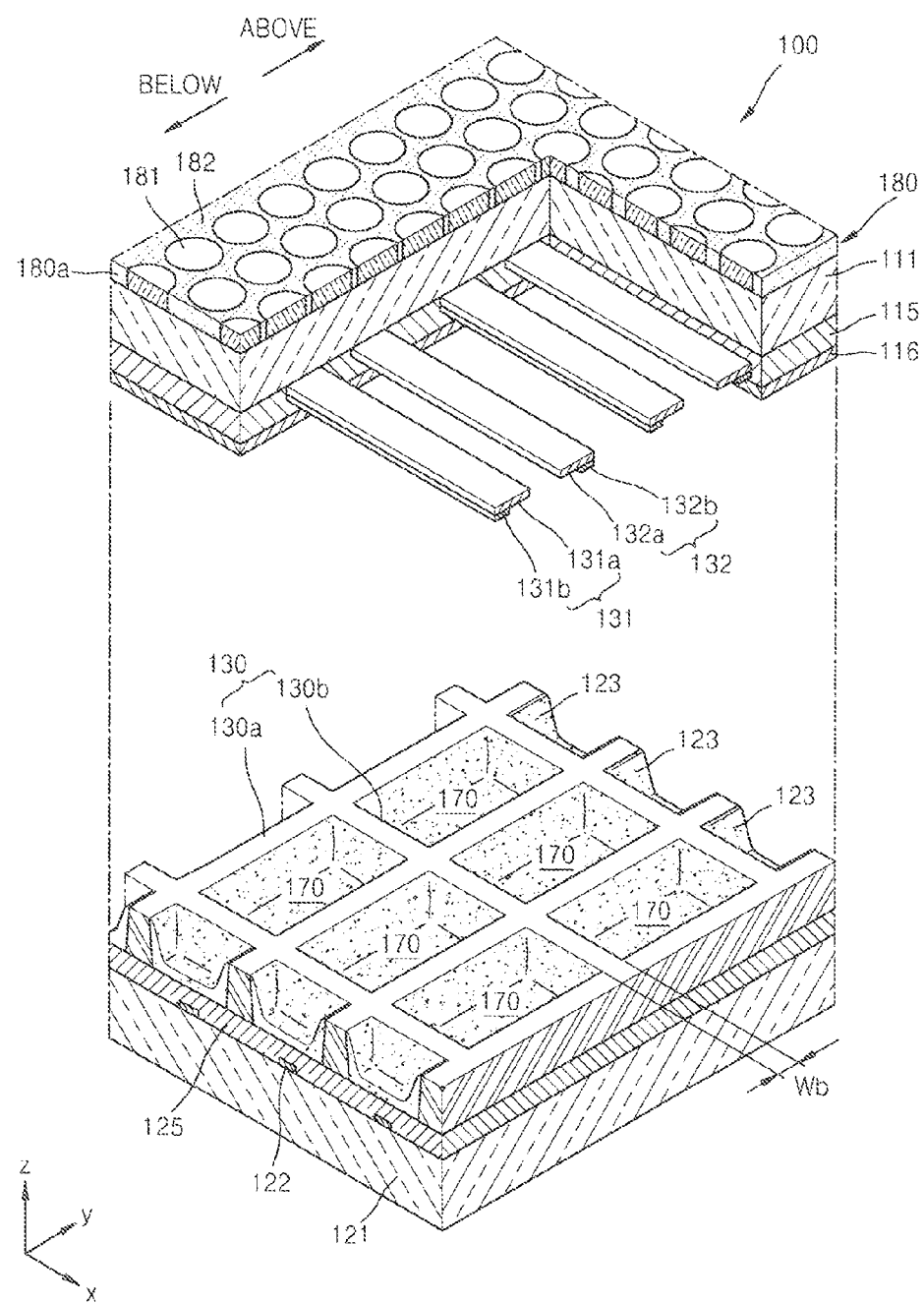
FIG. 6 is an exploded perspective view of a PDP on which the display filter of FIG. 1 is disposed, according to an embodiment of the principles the present invention.

FIG. 6 is an exploded perspective view of a PDP 100 on which a display filter 10 of FIG. 1 is disposed, according to an embodiment of the present invention.

Referring to FIG. 6, PDP 100 according to an embodiment of the present invention is an alternating current (AC) PDP. PDP 100 includes a first substrate 111, a second substrate 121, sustain electrodes 131 and 132, address electrodes 122, barrier ribs 130, a passivation layer 116, phosphor layers 123, a first dielectric material layer 115, a second dielectric material layer 125, and a display filter 180.

Here, first substrate 111 may be a front substrate, whereas second substrate 121 may be a rear substrate. Sustain electrodes 131 and 132 may be a sustain electrode pair which causes mutual sustain discharge, whereas address electrodes 122 may be address electrodes to which data pulses are applied to select discharge cells to cause sustain discharge. First dielectric material layer 115 may be a front dielectric material layer, whereas second dielectric material layer 125 may be a rear dielectric material layer.

First substrate 111 and second substrate 121 are disposed apart from each other and to face each other, and thus a discharge space in which discharge occurs is formed therebetween. First substrate 111 and second substrate 121 may be formed of a glass material with excellent visible ray transmittance. However, first substrate 111 and/or second substrate 121 may be colored to improve ambient contrast.

Barrier ribs 130 are disposed between first substrate 111 and second substrate 121. Barrier ribs 130 may be disposed on second dielectric material layer 125. Although FIG. 6 shows that barrier ribs 130 define discharge cells that are arranged in a matrix to have rectangular cross-sections, embodiments of the present invention are not limited thereto. Here, barrier ribs 130 may include barrier ribs 130a extending in the y-direction and barrier ribs 130b extending in the x-direction, where the y-axis direction is a lengthwise direction and the x-direction is a widthwise direction, and thus hereinafter barrier ribs 130a will be referred to as lengthwise barrier ribs 130a and barrier ribs 130b will be referred to as widthwise barrier ribs 130b.

Sustain electrodes 131 and 132 are disposed on a surface of first substrate 111 facing to second substrate 121. In each of the sustain electrode pairs, sustain electrode 131 acts as a common electrode and sustain electrode 132 acts as a scanning electrode. Furthermore, although the present embodiment shows a three-electrode structure, embodiments of the present invention may also be applied to a two-electrode structure.

Sustain electrode 131 and sustain electrode 132 include transparent electrodes 131a and 132a and bus electrodes 131b and 132b, respectively. First dielectric material layer 115 is formed on first substrate 111 to cover sustain electrodes 131 and 132. Furthermore, PDP 100 may further include passivation layer 116 which covers first dielectric material layer 115.

Address electrodes 122 are disposed on a surface of second substrate 121 facing first substrate 111. Address electrodes 122 extend across discharge cells 170 to cross sustain electrodes 131 and 132. A space formed by a pair of sustain electrodes 131 and 132 and address electrode 122 crossing the pair of sustain electrodes 131 and 132 forms a unit discharge cell 170.

Second dielectric material layer 125 is formed on second substrate 121 to cover address electrodes 122. Phosphor layers 123, which respectively emit red, green, and blue, are disposed on sidewalls of barrier ribs 130 formed on second dielectric material layer 125 and on portions of second dielectric material layer 125 on which barrier ribs 130 are not formed.

Furthermore, discharge cells 170 are filled with a discharge gas, which is a mixture of gases including neon (Ne) and xenon (Xe). When discharge cells 170 are filled with a discharge gas as described above, first substrate 111 and second substrate 121 are attached to each other and sealed with a sealant, such as frit glass formed along edges of first substrate 111 and second substrate 121.

Display filter 180 may be one of display filters 10, 20, and 50 shown in FIGS. 1, 4, and 5. Display filter 180 may include a base film 180a, which is disposed on a light extracting surface of a display panel, to improve ambient contrast. Here, base film 180a may include a phototransmissive unit 181 and a light absorbing unit 182.

Phototransmissive unit 181 has a constant cross-sectional area. Light absorbing unit 182 is disposed to surround phototransmissive unit 181, and includes a light absorbing material.

As described above, according to the one or more of the above embodiments of the present invention, ambient contrast may be improved as the transmittance of panel light emitted from inside of a display panel increases and externally incident light is absorbed and blocked by a light absorbing unit.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A display filter comprising:
   a base film disposed on a display panel, the base film comprising:
      a phototransmissive unit having a constant horizontal cross-sectional area; and
      a light absorbing unit which comprises a light, absorbing material and which surrounds the phototransmissive unit,
   with the horizontal cross-sectional area of the phototransmissive unit being constant from a first surface of the base film facing the display panel to a second surface positioned opposite to the first surface.

2. The display filter of claim 1, wherein the horizontal cross-section of the phototransmissive unit is one of circular, elliptical, rectangular, and polygonal.

3. The display filter of claim 2, wherein a plurality of the phototransmissive units are arranged next to each other in first rows and second rows that alternate with each other, and
   the phototransmissive units in each one of the first rows are disposed to alternate with the phototransmissive units in the immediately adjacent second rows.

4. The display filter of claim 2, wherein the light absorbing unit comprises colored pigments which absorb visible light rays.

5. The display filter of claim 2, further comprising:
   an anti-reflection film disposed on the base film; and
   an anti-glare film disposed on the anti-reflection film.

6. The display filter of claim 1, wherein a plurality of the phototransmissive units are arranged next to each other in first rows and second rows that alternate with each other, and
   the phototransmissive units in each one of the first rows are disposed to alternate with the phototransmissive units in the immediately adjacent second rows.

7. The display filter of claim 1, wherein the light absorbing unit comprises colored pigments which absorb visible light rays.

8. The display filter of claim 1, further comprising:
   an anti-reflection film disposed on the base film; and
   an anti-glare film disposed on the anti-reflection film.

9. A plasma display panel (PDP) comprising:
   a first substrate and a second substrate that are disposed apart from each other;
   sustain electrodes extending between the first substrate and the second substrate in a direction;
   address electrodes extending between the first substrate and the second substrate in another direction which is different from the direction in which the sustain electrodes extend;
   barrier ribs defining a plurality of discharge cells between the first substrate and the second substrate; and a base film disposed on the first substrate, the base film comprising:
  a phototransmissive unit having a constant horizontal cross-sectional area; and
  a light absorbing unit which comprises a light absorbing material and surrounds the phototransmissive unit,
  with the horizontal cross-sectional area of the phototransmissive unit being constant from a first surface of the base film facing the display panel to a second surface positioned opposite to the first surface.

10. The PDP of claim 9, wherein the cross-section of the phototransmissive unit is one of circular, elliptical, rectangular, and polygonal.

11. The PDP of claim 10, wherein a plurality of the phototransmissive units are arranged next to each other in first rows and second rows that alternate with each other, and the phototransmissive units in each one of the first rows are disposed to alternate with the phototransmissive units in the immediately adjacent second rows.

12. The PDP of claim 10, wherein the light absorbing unit comprises colored pigments which absorb visible rays.

13. The PDP of claim 9, wherein a plurality of the phototransmissive units are arranged next to each other in first rows and second rows that alternate with each other, and the phototransmissive units in each one of the first rows are disposed to alternate with the phototransmissive units in the immediately adjacent second rows.

14. The PDP of claim 9, wherein the light absorbing unit comprises colored pigments which absorb visible rays.

15. The PDP of claim 9, wherein the display filter further comprises:
  an anti-reflection film disposed on the base film; and
  an anti-glare film disposed on the anti-reflection film.

16. The PDP of claim 15, further comprising:
  a first dielectric material layer disposed on the first substrate to cover the sustain electrodes; and
  a second dielectric material layer dispose on the second substrate to cover the address electrodes.

17. The PDP of claim 16, further comprising:
  phosphor layers formed within the discharge cells; and
  a passivation layer which is formed to cover a surface of the first dielectric material layer facing the second substrate to protect the first dielectric material layer.

18. The PDP of claim 9, further comprising:
  a first dielectric material layer disposed on the first substrate to cover the sustain electrodes; and
  a second dielectric material layer dispose on the second substrate to cover the address electrodes.

19. The PDP of claim 18, further comprising:
  phosphor layers formed within the discharge cells; and
  a passivation layer which is formed to cover a surface of the first dielectric material layer facing the second substrate to protect the first dielectric material layer.

* * * * *